(12) United States Patent
Hwang

(10) Patent No.: US 11,878,542 B2
(45) Date of Patent: Jan. 23, 2024

(54) ARTICULATED ROBOT ARM AND PRINTING METHOD USING THE SAME

(71) Applicant: XYZ Inc., Seoul (KR)

(72) Inventor: Sung Jae Hwang, Seongnam-si (KR)

(73) Assignee: XYZ, Inc., Seoul (KR)

( * ) Notice: Subject to any disclaimer, the term of this patent is extended or adjusted under 35 U.S.C. 154(b) by 304 days.

(21) Appl. No.: 17/370,020

(22) Filed: Jul. 8, 2021

(65) Prior Publication Data

US 2021/0331507 A1    Oct. 28, 2021

Related U.S. Application Data

(63) Continuation of application No. PCT/KR2020/004947, filed on Apr. 10, 2020.

(30) Foreign Application Priority Data

Apr. 29, 2019   (KR) .................. 10-2019-0049811

(51) Int. Cl.
| | | |
|---|---|---|
| B41M 5/26 | (2006.01) | |
| B25J 9/06 | (2006.01) | |
| B25J 9/16 | (2006.01) | |
| B25J 11/00 | (2006.01) | |
| B25J 15/00 | (2006.01) | |

(52) U.S. Cl.
CPC ............ B41M 5/267 (2013.01); B25J 9/06 (2013.01); B25J 9/1612 (2013.01); B25J 9/1679 (2013.01); B25J 9/1697 (2013.01); B25J 11/0045 (2013.01); B25J 15/0028 (2013.01)

(58) Field of Classification Search
CPC . B41M 5/267; B25J 9/06; B25J 9/1612; B25J 9/1679; B25J 9/1697; B25J 11/0045
See application file for complete search history.

(56) References Cited

U.S. PATENT DOCUMENTS

2017/0011442 A1*   1/2017   Hu .................. G07G 1/00

FOREIGN PATENT DOCUMENTS

| KR | 1020090082150 A | 7/2009 |
|---|---|---|
| KR | 101716641 B1 | 3/2017 |
| KR | 101954255 B1 | 3/2019 |
| WO | 2011155575 A1 | 12/2011 |

OTHER PUBLICATIONS

Aoki, Toshimichi, Laser Processing Robot System, Jan. 16, 2018, China, All Pages (Year: 2018).*
Sheveleva Larissa; Laser Method of Scribing Graphics; May 9, 1997, CA, All Pages (Year: 1997).*
International Search Report of PCT/KR2020/004947 dated Nov. 24, 2020.

* cited by examiner

*Primary Examiner* — Justin Seo
*Assistant Examiner* — Tracey M McMillion
(74) *Attorney, Agent, or Firm* — Dinsmore & Shohl LLP; Yongsok Choi, Esq.

(57) ABSTRACT

Provided is an articulated robot arm capable of laser printing. The articulated robot arm includes: a communicator for receiving beverage order information; a grip part gripping and moving a cup; an articulation part having one side coupled to the grip part and including a plurality of articulation units; a controller controlling operations of the grip part and the articulation part; and a laser beam irradiation unit provided on at least a partial area of the grip part and irradiating a laser beam to print the beverage order information on the cup.

18 Claims, 8 Drawing Sheets

ARTICULATED ROBOT ARM AND PRINTING METHOD USING THE SAME

CROSS-REFERENCE TO RELATED APPLICATIONS

This application is a continuation of International Application No. PCT/KR2020/004947 filed on Apr. 10, 2020, which claims priority to Korean Patent Application No. 10-2019-0049811 filed on Apr. 29, 2019, the entire contents of which are herein incorporated by reference.

BACKGROUND

1. Field

The present disclosure relates to an articulated robot arm and a printing method using the articulated robot arm. More particularly, the present disclosure relates to an articulated robot arm that receives beverage order information and prints the beverage order information on a cup using a laser, and a printing method using the articulated robot arm.

2. Description of Related Art

With the development of artificial intelligence, technology for making a beverage by using an unmanned robot has been developed. For example, a process from green bean roasting to blending, grinding, and espresso extraction is automatically performed. Accordingly, a portion in which humans participate in the process of making a coffee has been gradually reduced. However, the above-mentioned automation process is focused on a process of making a beverage in a cup. A process of marking information about a cup, which is a medium for delivering the prepared beverage to an orderer, is still a process in which a person participates. For example, it is general to print order information on a sticker and attach the sticker to a cup.

In such an information marking method, a true unmanned system in which human participation is not required has not been achieved yet.

SUMMARY

The present disclosure is to print beverage order information on a cup containing a beverage by using an articulated robot arm with a laser.

In addition, the present disclosure is to reduce the time for making a beverage by a robot by printing on the cup during a cup gripping process or a beverage making process.

Further, the purpose of the present disclosure is to make an unmanned system in a beverage making process.

The problems to be solved of the present disclosure are not limited to the above-mentioned contents, and other technical problems that are not mentioned will be clearly understood to those of skill in the art from the following description.

Additional aspects will be set forth in part in the description that follows and, in part, will be apparent from the description, or may be learned by practice of the embodiments of the present disclosure.

According to an embodiment of the present disclosure, an articulated robot arm capable of laser printing, the articulated robot arm includes a communicator configured to receive beverage order information, a grip part configured to grip and move a cup, an articulation part having one side coupled to the grip part, the articulation part comprising a plurality of articulation units, a controller configured to control operations of the grip part and the articulation part, and a laser beam irradiation unit provided on at least a partial area of the grip part and configured to irradiate a laser beam to print the beverage order information on the cup.

The articulated robot arm may further include an image sensor unit configured to scan the cup and detect a printing area based on a reference gray scale value.

The controller may be further configured to control at least one of the articulation part and the grip part to allow the laser beam irradiation unit to be positioned close to the printing area.

The laser beam irradiation unit may include a distance measurement unit configured to measure a focal length of a laser beam, and the controller may be further configured to allow the focal length measured in real time by the distance measurement unit to be a same while the laser beam irradiation unit irradiates a laser beam.

The image sensor unit may be further configured to determine a material or printability of the cup based on an image of the cup, and, the laser beam irradiation unit may be further configured to adjust an intensity of the laser beam based on the material of the cup.

The image sensor unit may be further configured to determine whether an object or an entity is present in an irradiation area of the laser beam irradiation unit, and the controller is configured to stop the laser irradiation of the laser beam irradiation unit when it is determined that the object or the entity is present in the irradiation area of the laser beam irradiation unit.

The articulated robot arm may further include a water supply unit configured to receive and discharge external water, and the controller may be further configured to control operations of the grip part and the articulation part to use a beverage making accessory device according to a making recipe based on the beverage order information received by the communicator.

The beverage order information may include at least one of an ordered beverage name, a beverage size, an order recipe, an orderer's name, and an orderer's request.

When the grip part grips the cup and moves the cup to a placement spot, the laser beam irradiation unit may print the beverage order information.

When a beverage is being made in a beverage making accessory device, the laser beam irradiation unit may print the beverage order information on the cup.

The laser beam irradiation unit may further include an opening and closing part configured to perform an opening and closing operation to be inserted into the grip part during a non-operation.

According to another embodiment, a printing method using an articulated robot arm capable of laser printing may include a receiving operation of receiving beverage order information, a gripping and moving operation of gripping and moving a cup by using a grip part and an articulation part, and a printing operation of printing the beverage order information on the cup using a laser.

The printing method may further include a printing area detection operation of scanning the cup and detecting a printing area based on a reference gray scale value.

In the printing area detection operation, the articulated robot arm may be positioned close to the printing area.

The printing operation may include a distance measurement operation of measuring a focal length of a laser, and a laser beam irradiation operation of allowing the focal length measured in real time by a distance measurement unit to be a same while a laser beam is irradiated.

The printing area detection operation may include determining a material or printability of the cup based on an image of the cup through image sensing, and the printing operation may include adjusting an intensity of a laser beam based on the material of the cup.

The printing operation may include determining whether an object or an entity is present in an irradiation area of a laser beam, and stopping a laser beam irradiation when it is determined that the object or the entity is present in the irradiation area of the laser beam.

The printing method may further include a recipe determination operation of determining a making recipe based on the received beverage order information, and an accessory device determination operation of determining a beverage making accessory device to be used according to the making recipe, and determining an order of use of the beverage making accessory device.

The beverage order information may include at least one of an ordered beverage name, a beverage size, an order recipe, an orderer's name, and an orderer's request.

The printing operation may include printing the beverage order information when the cup is gripped and moved to a placement spot.

The printing operation may include printing the beverage order information on the cup when coffee is made by the beverage making accessory device.

The printing operation may further include an opening and closing operation of performing an opening and closing operation to allow the laser beam irradiation unit to be exposed outside of the grip part when the laser beam irradiation unit is operated.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
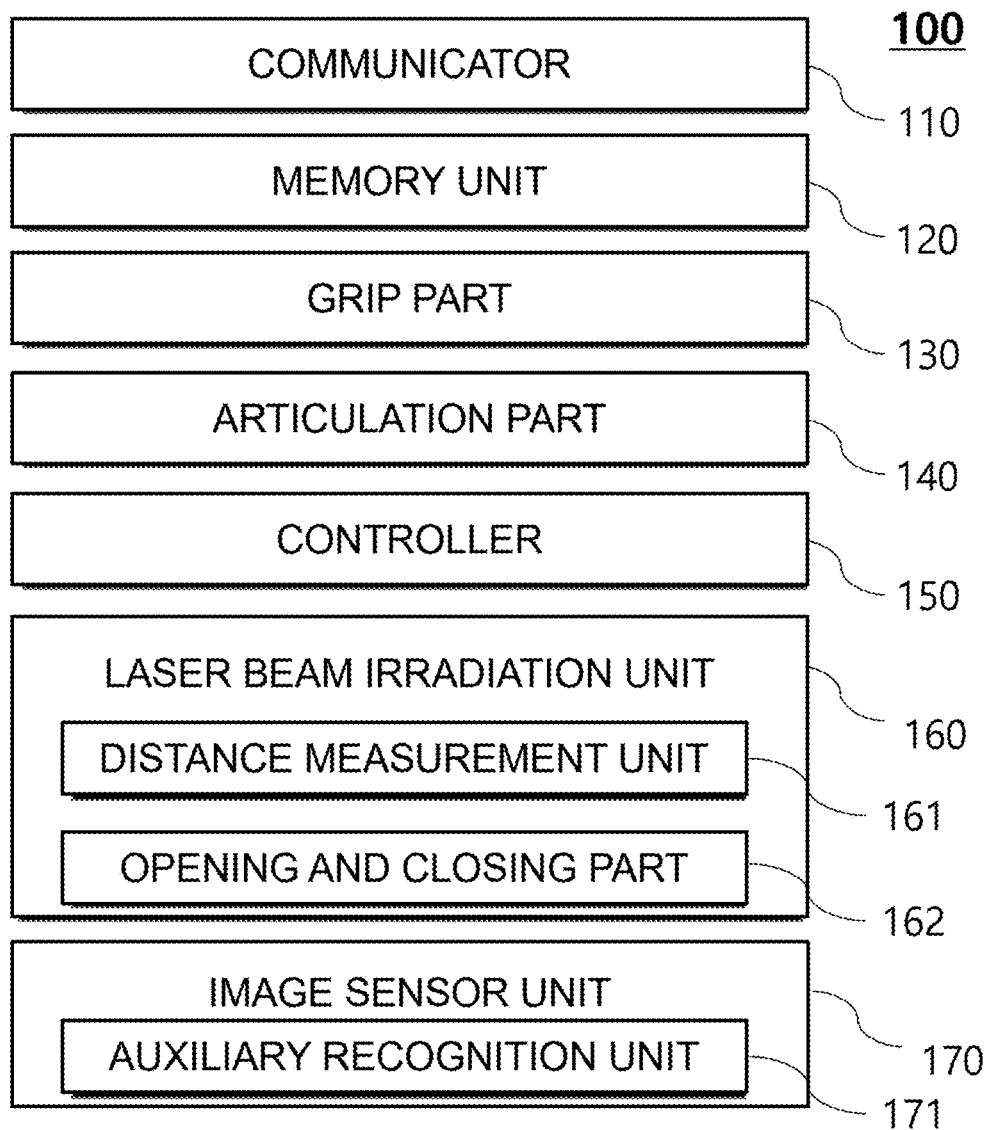
FIG. 1 is a block diagram of an articulated robot arm according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of", when preceding a list of elements, modify the entire list of elements and do not modify the individual elements of the list.

One or more embodiments of the present disclosure will be described below in more detail with reference to the accompanying drawings so that those of skill in the art may easily work the embodiments of the present disclosure. The present embodiments may have different forms and configuration and should not be construed as being limited to the descriptions set forth herein. In addition, in order to clearly explain the embodiments of the present disclosure in the drawings, parts that are not related to description is omitted.

The terms used herein are used to illustrate specific embodiments only, and are not intended to limit the present disclosure. An expression used in the singular encompasses an expression of the plural unless the context expressly indicates otherwise.

In the present disclosure, terms such as "comprise", "have", or "include" are intended to indicate that features, numbers, operations, components, parts, or combinations thereof described in the present disclosure are present, and it can be understood that the present or additional possibility of one or more other features, numbers, operations, components, parts, or combinations thereof is not excluded in advance.

In addition, elements shown in embodiments of the present disclosure are independently shown to represent different characteristic functions, and it does not mean that each of the elements is configured by separate hardware or one software unit. That is, for convenience of description, each of the elements is described by being arranged as each element, and at least two components among the respective components are combined to form one element or one element is divided into a plurality of elements to perform a function. An integrated embodiment and a separated embodiment of each of the elements are included in the scope of the present disclosure without departing from the spirit of the present disclosure.

In addition, the following embodiments are provided to more clearly describe an ordinary knowledge in the art, and shapes and sizes of elements in the drawings may be exaggerated for more clear description.

Hereinafter, embodiments of the present disclosure will be described with reference to the accompanying drawings.

FIG. 1 is a block diagram of an articulated robot arm according to an embodiment of the present disclosure.

Referring to FIG. 1, an articulated robot arm 100 capable of laser printing according to an embodiment may include a communicator 110, a memory unit 120, a grip part 130, an articulation part 140, a controller 150, a laser beam irradiation unit 160, and an image sensor unit 170.

The communicator 110 may receive beverage order information. The beverage order information may be received from an external terminal (not shown) to which the beverage order information is input via a network. Here, the network may be a wired or wireless network. In addition, the network may be a network in which the external terminal and the articulated robot arm 100 are directly connected to each other and may be a private network generated by a repeater. In addition, the network may be a communication network that is a high-speed backbone network of a large-sized communication network capable of large capacity, long-distance voice, and data service, and may be a next-generation wired/wireless network for providing an Internet or a high-speed multimedia service. When the network is a wireless communication network, the network may include cellular communication or near-field communication. For example, the cellular communication may include at least one of long-term evolution (LTE), LTE Advanced (LTE-A), 5th Generation (5G), code division multiple access (CDMA), wideband CDMA (WCDMA), universal mobile telecommunications system (UMTS), wireless broadband (WiBro), and global system for mobile communications (GSM). In addition, the near field communication may include at least one of wireless fidelity (Wi-Fi), Bluetooth, Zigbee, or near field communication (NFC). However, the present disclosure is not limited thereto, and a technology of wireless communication that will be developed later may be included.

The memory unit 120 may store data received or generated by the articulated robot arm 100. In addition, commands or data related to at least one other element may be stored. For example, it may be a hard disk drive, solid state drive, flash memory, or any other suitable storage device including dynamic memory such as SRAM and DRAM. The beverage order information received through the communicator 110 may be stored in the memory unit 120.

The grip part 130 may grab and move a cup. The grip part 130 may be coupled to one side of the articulation part 140. The articulation part 140 may include a plurality of articulation units and a plurality of arms connected to the articulation units. Because the articulation unit may perform three-dimensional rotation, movement of the plurality of arms may be controlled through rotation of the plurality of articulation units. The one side coupled to the grip part 130 may be one side of one of the plurality of arms.

The controller 150 may perform various control and processing operations of the articulated robot arm 100, and may perform calculation or data processing on control and communication of a plurality of elements. In particular, operations of the grip part 130 and the articulation part 140 may be controlled. For example, the controller 150 may include a central processing unit (CPU) including an application processor (AP) or a microprocessor. In addition, the controller 150 may include the memory unit 120.

The laser beam irradiation unit 160 is provided in at least a partial area of the grip part 130, and may irradiate a laser beam to print beverage order information on various materials, for example, a paper cup, a glass cup, a plastic cup, and the like, with the laser. Such laser printing may also be referred to laser stamping or laser engraving.

In addition, when the laser beam irradiation unit 160 prints on a cup, the articulation part 140 may rotate to adjust horizontality of the laser beam irradiation unit 160 when the laser beam irradiation unit 160 is not horizontally aligned with the cup, thereby aligning the laser beam irradiation unit 160 with the cup.

The image sensor unit 170 may include at least one small camera capable of photographing an object such as a cup and an object around the object, and may detect a printing area based on a reference gray scale value by scanning the cup.

The image sensor unit 170 may further include an auxiliary recognition unit 171 for recognizing a check area of a cup. The auxiliary recognition unit 171 may recognize the check area printed on the cup. The check area is an area printed with a specific figure, for example, a specific area having a rectangular or circular shape. When the auxiliary recognition unit 171 recognizes the check area, the laser beam irradiation unit 160 may print a check in the recognized check area. The articulation part 140 may move a position of the laser beam irradiation unit 160 to the front of the check area to allow the laser beam irradiation unit 160 to perform printing in the recognized check area.

Figure 2A:
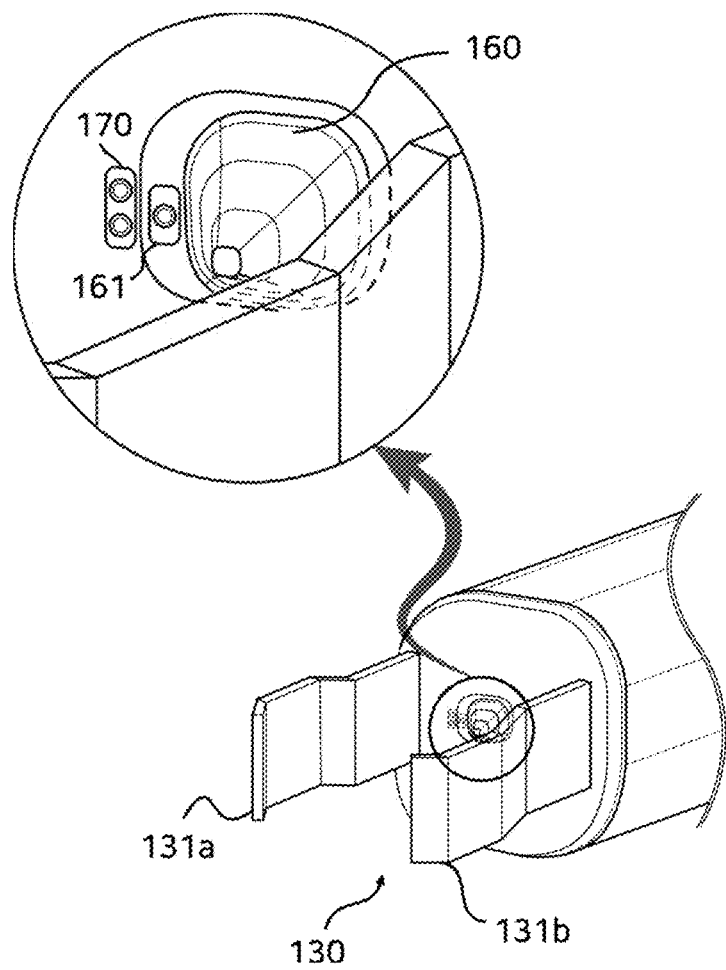
FIG. 2A is a view of a grip part and a laser beam irradiation unit according to an embodiment of the present disclosure.
Figure 2B:
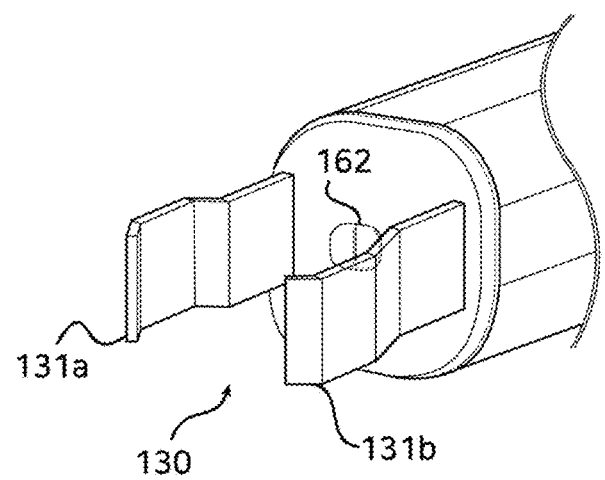
FIG. 2B illustrates a state in which a laser beam irradiation unit is inserted into an opening and closing portion, according to an embodiment of the present disclosure.

FIG. 2A is a view of a grip part and a laser beam irradiation unit according to an embodiment of the present disclosure, and FIG. 2B illustrates a state in which a laser beam irradiation unit is inserted into an opening and closing part, according to an embodiment of the present disclosure.

Referring to FIGS. 2A and 2B, the grip part 130 may be coupled to one side of the articulation part 140. The grip part 130 may include a first gripper 131a and a second gripper 131b. The first gripper 131a and the second gripper 131b may grip a cup or an object under the control of the controller 150 of FIG. 1. When the grip part 130 grips a cup or an object, the first gripper 131a and the second gripper 131b grip the cup or the object by reducing a distance between the two grippers according to a width of the object. The width of the cup or the object may be measured by the image sensor unit 170 of FIG. 1 through scanning, and the controller 150 may control the distance between the first gripper 131a and the second gripper 131b according to the measured width. A shape of the grip part 130 shown in FIGS. 2A and 2B is not limited to the illustrated shape and may be any shape capable of gripping a cup or an object. In addition, the number of grippers included in the grip part 130 is not limited.

The laser beam irradiation unit 160 may be provided in a partial region of the grip part 130, and for example, the laser beam irradiation unit 160 may be disposed at a center between the grippers 131a and 131b of the grip part 130. The laser beam irradiation unit 160 may include a distance measurement unit 161 for measuring a focal length of a laser beam. The distance measurement unit 161 will be described in detail later below.

The laser beam irradiation unit 160 may generate a laser beam and print beverage order information on a cup or an object. Here, the printing may refer to marking characters or pictures on a cup or an object, such as marking, engraving, and stamping, using a laser. Before the laser beam irradiation unit 160 prints the beverage order information on the cup or the object, the image sensor unit 170 may determine a material of the cup or whether printing is possible based on an image of the cup. For example, the image sensor unit 170 may determine the material of the cup by recognizing an image or text representing the shape of the cup or material information marked on at least a portion of the cup, and determine whether printing is possible according to the material of the cup.

In addition, the laser beam irradiation unit 160 may adjust an intensity of the laser beam according to the material of the cup. The intensity of the laser beam may be an intensity that is printed on the cup to leave a printing trace but does not penetrate the cup. The intensity of the laser beam may be preset according to the material of the cup.

In addition, the laser beam irradiation unit 160 may further include an opening and closing part 162 for performing an opening and closing operation, the opening and closing part being inserted into the grip part 130 when the laser beam irradiation unit 160 is not operated. The laser beam irradiation unit 160 is provided in a partial area of the grip part 130, and may protrude from the partial area according to a shape thereof. Thus, when the laser beam irradiation unit 160 is protruded all the time, the grip part 130 may be prevented from gripping a cup or an object. In addition, when the grip part 130 grips a cup or an object, the laser beam irradiation unit 160 may be damaged due to the cup or the object. To prevent this, when the laser beam irradiation unit 160 is not operated, the laser beam irradiation unit 160 may be inserted into the grip part 130 and may close an entrance thereof. When the laser beam irradiation unit 160 is printing, the entrance of the opening and closing part 162 may be opened and the laser beam irradiation unit 160 may be discharged to the outside of the grip part 130.

After the image sensor unit 170 determines the material of the cup, when it is determined that the determined material of the cup is not a printable material, the laser beam irradiation unit 160 may reject printing.

In addition, the image sensor unit 170 may determine whether an object or an entity is present in a laser irradiation area of the laser beam irradiation unit 160, and when it is determined that the object or the entity is present, the controller of FIG. 1 may control the laser beam irradiation unit 160 to stop the laser beam irradiation. Here, the object or the entity is not allowed to perform laser printing of the laser beam irradiation unit 160, and may be, for example, a human body or an object having a risk of damage due to laser printing. When a target is out of the laser beam irradiation area due to an unexpected movement during laser printing, a laser beam may be irradiated to another object or human body, which is dangerous. Therefore, the determination of whether the object or the entity is present may ensure safety of the user and the object around the articulated robot arm 100 during laser irradiation.

Figure 3:
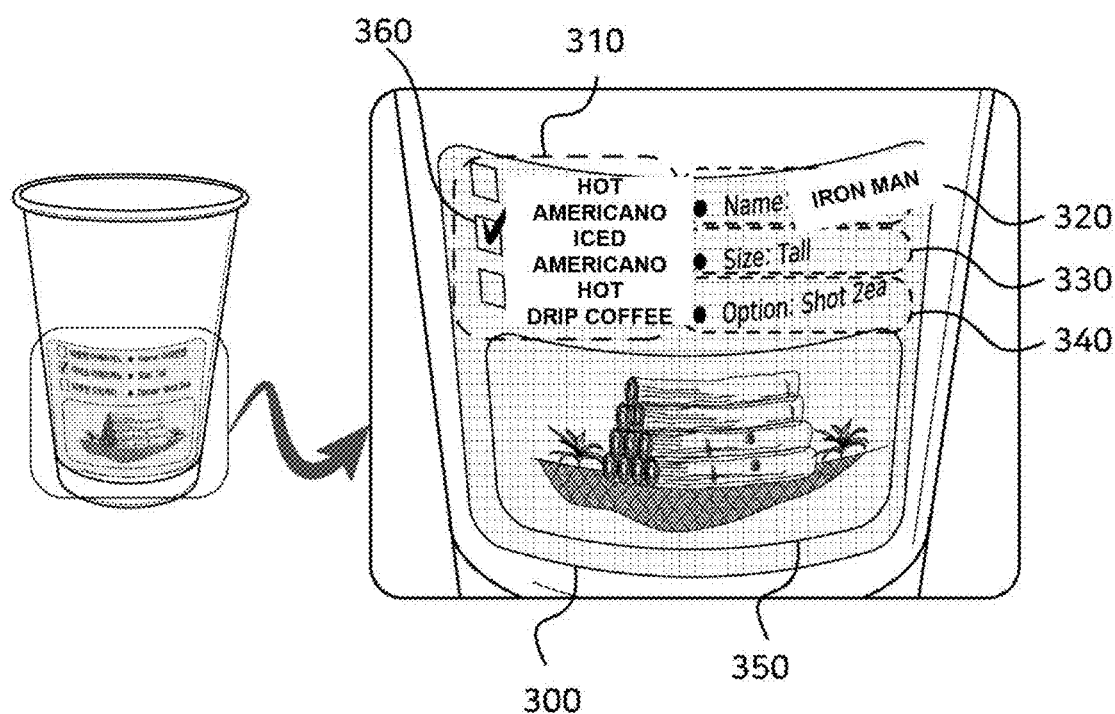
FIG. 3 illustrates that a laser beam irradiation unit prints beverage order information on a cup, according to an embodiment of the present disclosure.

FIG. 3 illustrates that a laser beam irradiation unit prints beverage order information on a cup, according to an embodiment of the present disclosure.

Referring to FIG. 3, the beverage order information printed by a laser beam irradiation unit according to an embodiment of the present disclosure may include an ordered beverage name 310, an orderer's name 320, a beverage size 330, a beverage recipe 340, and an orderer's request 350.

The ordered beverage name 310 may be printed on a cup, or a plurality of different beverage names may be printed with a marking on the corresponding ordered beverage name. The orderer's request 350 may be information that shows a text or a picture specifically requested by an orderer when ordering. For example, the information may include a message sent by an orderer to a receiver, a picture or a photo that the orderer likes, a sentence designated by the orderer, and information about a fortune of the day that changes over time. The orderer's request 350 may reflect the orderer's needs as a unique printing portion of the order.

The beverage order information may be printed in a printing area 300. The image sensor unit 170 may scan the cup to detect the printing area 300 based on a reference gray scale value. The reference gray scale value may be predetermined from about 0 to about 255 of the gray scale value. The image sensor unit 170 may scan the cup to detect an area exceeding the reference gray scale value, and the controller 150 may recognize the detected area as the printing area 300. When the printing area 300 is detected, the laser beam irradiation unit 160 may enlarge or reduce the beverage order information according to a size of the printing area 300 and print the beverage order information.

A check area 360 may be previously printed on the cup. As shown in FIG. 3, several beverage names are marked, and the check area 360 may be printed next to the beverage names to check the beverage names. The auxiliary recognition unit 171 may recognize the check area 360 printed on the cup, and the laser beam irradiation unit 160 may print a check on the check area 360 recognized by the auxiliary recognition unit 171 based on the beverage order information.

For example, when the received beverage order information is "Iced Americano", the auxiliary recognition unit 171 may recognize the check area 360 next to the order name printed as "Iced Americano", and the laser beam irradiation unit 160 may print a check in the check area 360. The check area 360 may have a rectangular shape or a square shape as shown in FIG. 3, but is not limited thereto and may vary according to a preset shape.

The auxiliary recognition unit 171 may recognize a plurality of order names printed on the cup by characters in order to recognize a corresponding check area among a plurality of check areas. The controller 150 may determine an order name matching the order name of the beverage order information among the order names recognized by characters. The laser beam irradiation unit 160 may print a check in a check area at a location corresponding to the matching order name.

Figure 4:
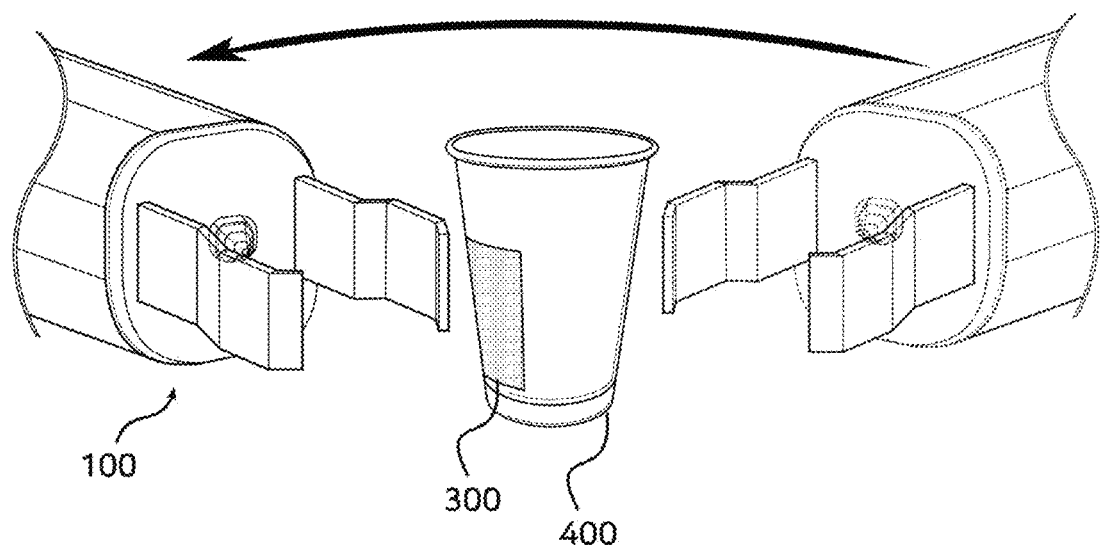
FIG. 4 illustrates a state in which an articulated robot arm scans a printing area, according to an embodiment of the present disclosure.

FIG. 4 illustrates a state in which an articulated robot arm scans a printing area, according to an embodiment of the present disclosure.

Referring to FIG. 4, when the articulated robot arm 100 according to an embodiment of the present disclosure prints the beverage order information on the cup 400, the laser beam irradiation unit 160 may move close to the printing area 300 of the cup 400. As described with reference to FIG. 4, the image sensor unit 170 may scan the cup 400 and detect the printing area 300. In this case, the controller 150 may control the articulation part 140 and the grip part 130 to allow the printing area 300 to be located in front of the laser beam irradiation unit 160 according to the detected printing area 300.

The printing area 300 may be randomly positioned according to an arrangement state of the cup 400. Because the laser beam irradiation unit 160 through which the laser beam is output is located in a portion of the grip part 130, the printing area 300 may be located in a direction facing the grip part 130. Thus, the controller 150 may move the grip part 130 close to face the printing area 300 according to a detected location of the printing area 300 of the image sensor unit 170.

In general, laser printing has been performed to arrange a printing area according to a position where a laser beam is irradiated. However, in the printing using the articulated robot arm 100 according to the present disclosure, because the laser beam irradiation unit 160 is disposed based on the printing area 300, the laser printing according to a random position of the cup may be performed.

Figure 5:
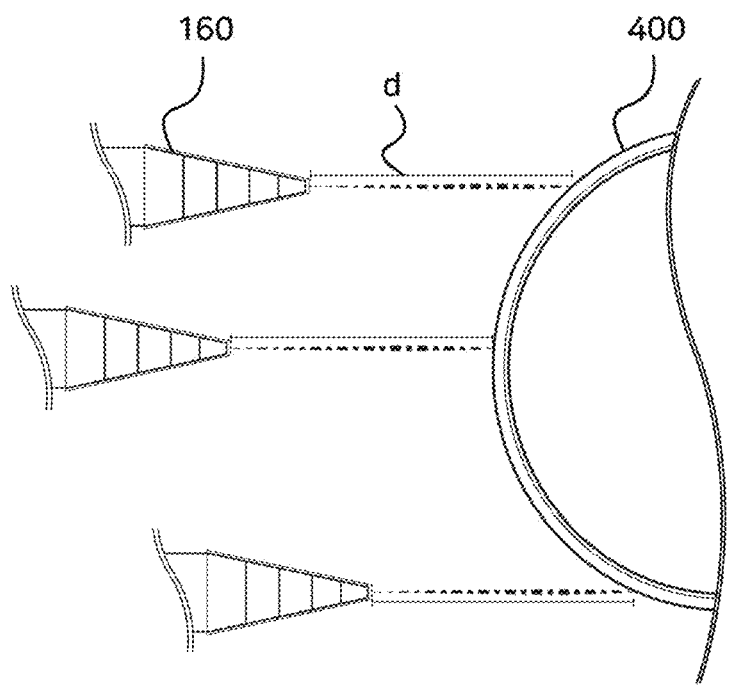
FIG. 5 is a view of laser printing of a laser beam irradiation unit according to an embodiment of the present disclosure.

FIG. 5 is a view of laser printing of a laser beam irradiation unit according to an embodiment of the present disclosure.

Referring to FIGS. 1, 2A, and 5, the laser beam irradiation unit 160 according to an embodiment of the present disclosure may include a distance measurement unit 161 for measuring a focal length d of a laser beam. The controller 150 may maintain the focal length d measured in real time by the distance measurement unit 161 to be the same while the laser beam irradiation unit 160 irradiates a laser beam. The focal length d may be a distance between the laser beam irradiation unit 160 and a surface of the printing area 300.

More specifically, the cup 400 has a cylindrical shape. Therefore, the printing area 300 formed along a surface of the cup 400 generally has a curved shape rather than a flat shape. In such a curved surface, laser beams having the same intensity move to a plane, and when the laser beams are irradiated, the focal length d of the laser beams is changed, and thus, a printing result may be unbalanced.

The distance measurement unit 161 may prevent the printing result from being unbalanced. The distance measurement unit 161 may measure the focal length d in real time. The controller 150 controls the articulated robot arm 100 such that the focal length d is not changed while the laser beams are irradiated. For example, the laser beam irradiation unit 160 may move forward and backward to maintain the focal length d, or the articulation part 140 may move to maintain the focal length d.

Figure 6:
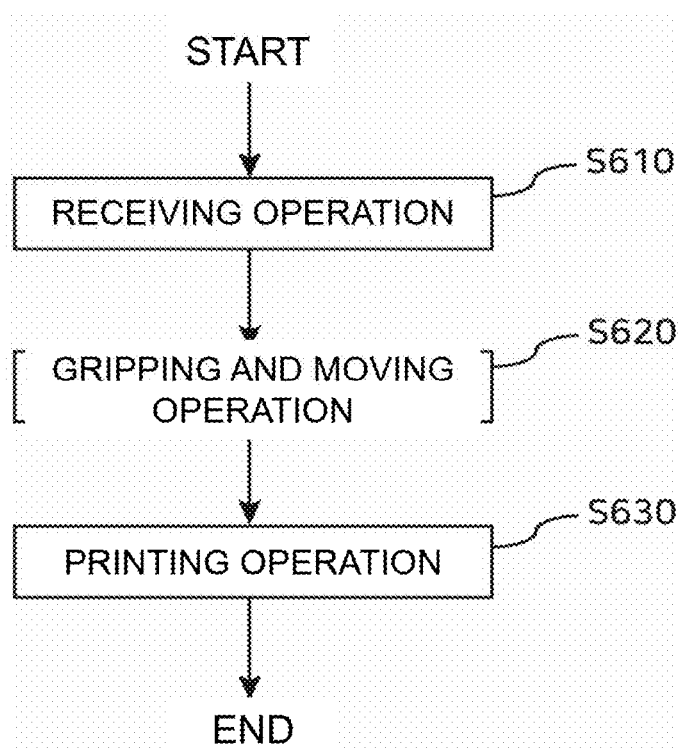
FIG. 6 is a flowchart of a printing method using an articulated robot arm according to an embodiment of the present disclosure.

FIG. 6 is a flowchart of a printing method using an articulated robot arm, according to an embodiment of the present disclosure.

Referring to FIG. 6, a printing method using an articulated robot arm capable of laser printing according to an embodiment of the present disclosure may include a receiving operation of receiving beverage order information (S610), a gripping and moving operation of gripping and moving a cup with a grip part and moving the cup using a plurality of articulation units (S620), and a printing operation of printing the beverage order information on the cup using a laser (S630).

Here, the beverage order information may include at least one of an ordered beverage name, a beverage size, an order recipe, an orderer's name, and an orderer's request.

Figure 7:
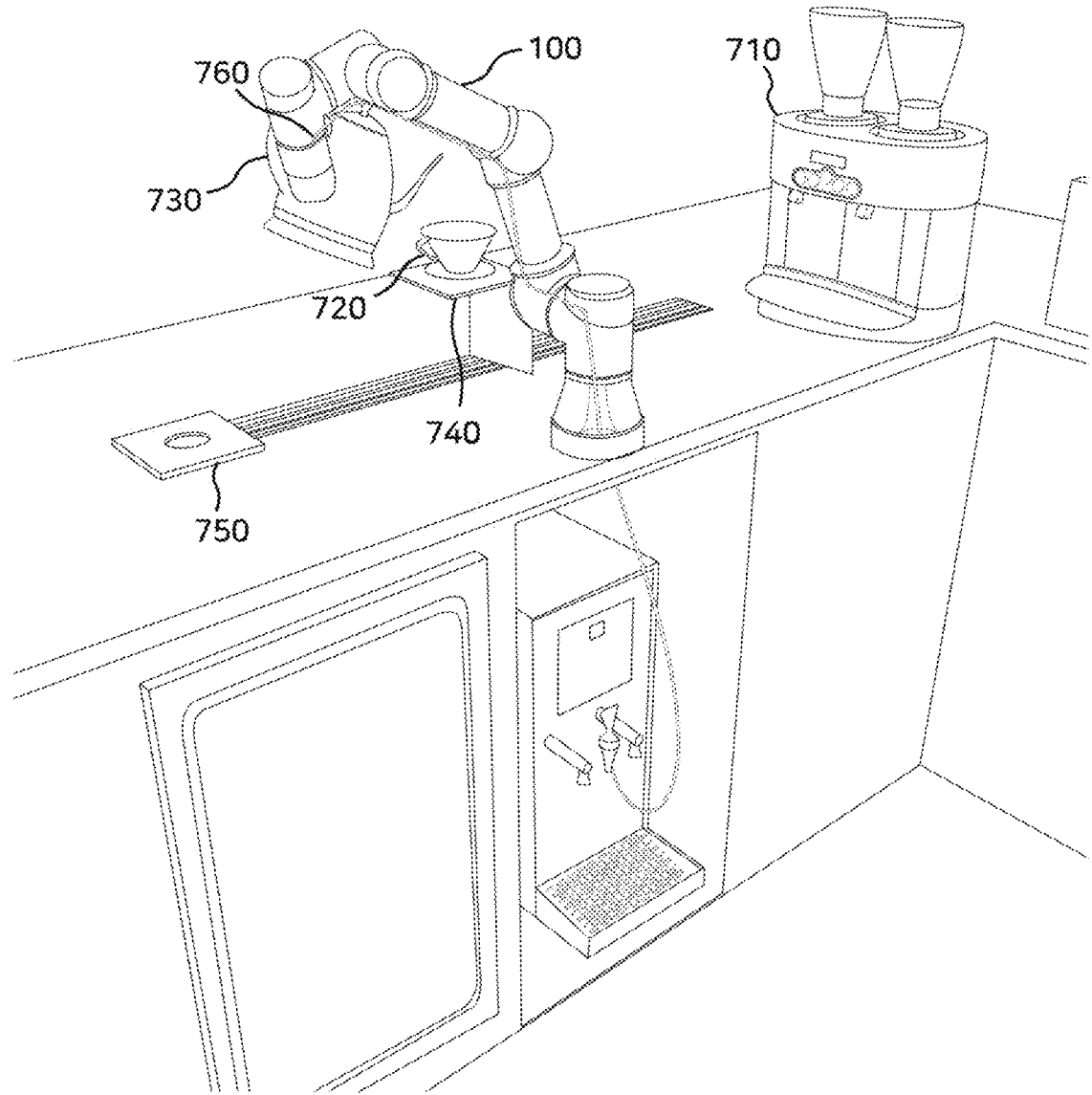
FIG. 7 is a view of a process of making a beverage using an articulated robot arm, according to an embodiment.

FIG. 7 is a view of a process of making a beverage using an articulated robot arm, according to an embodiment.

Referring to FIG. 7, a beverage making accessory device may be used to making a beverage using the articulated robot arm 100 according to an embodiment of the present disclosure. The beverage making accessory device may include a raw material processing device or a cooking device for making a beverage. For example, when coffee is made, the beverage making accessory device may include a roaster (not shown) for roasting raw green beans, a grinder 710 for grinding raw coffee beans, a dripper 720, an espresso extractor (not shown), and a kettle 730 for drip coffee.

When the beverage order information is received through the communicator 110, the controller 150 may determine a making recipe according to an ordered beverage name of the beverage order information in making a beverage using the articulated robot arm 100. The memory unit 120 may store each making recipe in which an ordered beverage name is designated as an identification code. The controller 150 may determine a beverage making accessory device to be used according to the determined making recipe, and may use the beverage making accessory device according to a making sequence of the making recipe. A processing device of the beverage making accessory device may be connected to the articulated robot arm 100 through a network and may operate according to an operation of the articulated robot arm 100 according to the making sequence.

For example, when the beverage order name of the received beverage order information is a hand drip coffee, the controller 150 may determine the coffee grinder 710, the dripper 720, and the kettle 730 according to the hand drip coffee recipe stored in the memory unit 120. First, the coffee grinder 710 is operated, and the articulated robot arm 100 may grip the dripper 720 into which a filtering net is inserted, in the grip part 130, and receive a raw coffee bean powder extracted by the coffee grinder 710. In addition, the articulated robot arm 100 may move the dripper 720 to a drip spot 740 for coffee drip, and may grip the kettle 730, to pour appropriate water in the dripper 720 according to the recipe. Thereafter, the articulated robot arm 100 may scan the inside of the dripper 720 using the image sensor unit 170, and when the water is moved down, the articulated robot arm 100 may grip the cup and move the cup to a placement spot 750.

The articulated robot arm 100 may include a water supply unit 760 that receives water from the outside and discharges the water. In the above-mentioned example, the water supply unit 760 may replace the kettle 730 for water supply.

When the articulated robot arm 100 grips the cup with the grip part 130 and moves the cup to the placement spot 750, the laser beam irradiation unit 160 may print the order information on the printing area 300. Alternatively, when a beverage is made in the beverage making accessory device, beverage order information may be printed on the cup. An order of printing may be determined according to a recipe by the controller 150. For example, for hand-drip coffee, the beverage order information may be printed when the coffee is extracted from the dripper 720, and for espresso coffee, the beverage order information may be printed while the grip part 130 grips the cup.

Figure 8:
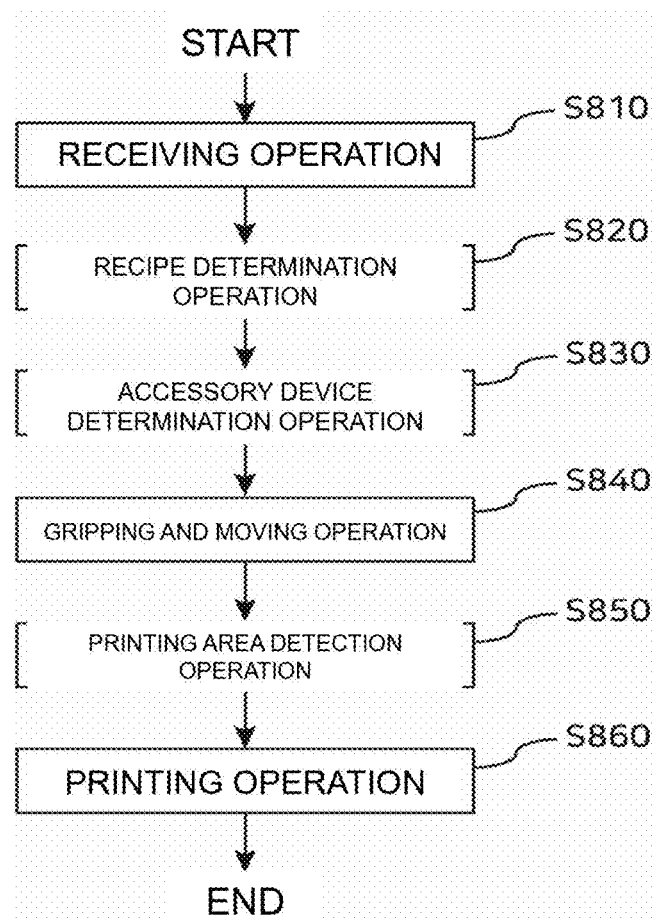
FIG. 8 is a flowchart of a printing method using an articulated robot arm, according to an embodiment of the present disclosure.

FIG. 8 is a flowchart of a printing method using an articulated robot arm, according to an embodiment of the present disclosure.

Referring to FIG. 8, the printing method using the articulated robot arm according to an embodiment of the present disclosure may include a receiving operation S810, a recipe determination operation S820, an accessory device determination operation S830, a gripping and moving operation S840, a printing area detection operation S850, and a printing operation S860. When beverage order information is received in the receiving operation S810, the recipe determination operation S820 may be performed to determine a making recipe based on the received beverage order information. When the making recipe is determined in the recipe determination operation S820, the accessory device determination operation S830 may be performed to determine a beverage making accessory device to be used according to the making recipe and to determine an order in which the beverage making accessory device is to be used.

According to the order of use of the beverage making accessory device and the beverage making accessory device determined in the accessory device determination operation S830, the gripping and moving operation S840 of gripping and moving a cup to make a beverage using the beverage accessory device with the articulated robot arm may be performed. In addition, the printing area detection operation S850 of scanning a cup to detect a printing area based on a reference gray scale value may be performed. In addition, in the printing area detection operation S850, the articulated robot arm may be positioned close to the printing area.

When the printing area is detected in the printing area detection operation S850, the printing operation S860 may be performed in which the beverage order information is printed on the cup using a laser. In the printing operation S860, it is determined whether an object or an entity is present in the irradiation area of the laser beam, and when it is determined that the object or the entity is present, the laser beam irradiation may be stopped.

In addition, the printing operation S860 may include printing the beverage order information when moving to the placement spot while gripping the cup, or may include printing the beverage order information in the cup when the coffee is made in the beverage making accessory device.

In addition, in the printing area detection operation S850, a material or printability of the cup is determined based on an image of the cup through image sensing, and in the printing operation S860, an intensity of the laser beam may be adjusted based on the material of the cup.

In addition, the printing operation S860 may further include an auxiliary recognition operation (not shown) of recognizing a check area of the cup, and a check may be printed on the check area recognized in the auxiliary recognition operation.

Figure 9:
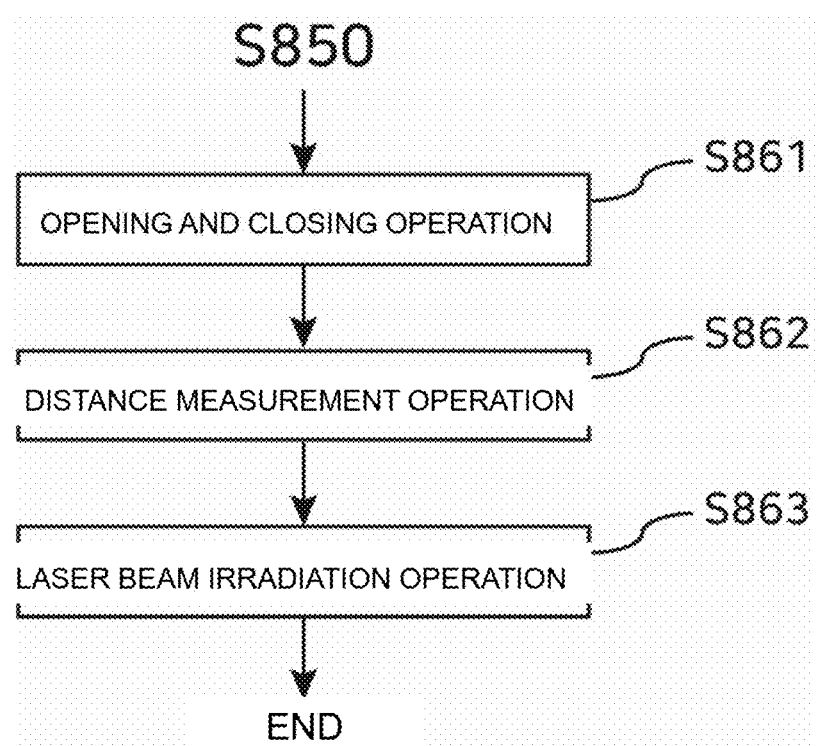
FIG. 9 is a flowchart of a detailed printing operation according to an embodiment of the present disclosure.

FIG. 9 is a flowchart of detailed operations of a printing operation according to an embodiment of the present disclosure.

Referring to FIG. 9, in the articulated robot arm according to an embodiment of the present disclosure, when the laser beam irradiation unit is operated in the printing operation S860, an opening and closing operation S861 of performing an opening and closing operation exposed to the outside of the grip part may be first performed. When the laser beam irradiation unit is exposed to the outside of the grip part by performing an opening and closing operation S861, a distance measurement operation S862 of measuring a focal length of the laser may be performed. When the focal length is measured, a laser beam irradiation operation S863 may be performed in which a focal length measured in real time by the distance measurement unit during the irradiation of the laser beam remains unchanged. The distance measurement operation S862 and the laser beam irradiation operation S863 may be simultaneously performed in real time.

According to an articulated robot arm and a printing method using the articulated robot arm according to an embodiment, beverage order information may be printed on a cup containing a beverage by the articulated robot arm using a laser.

In addition, by printing on the cup, the time for making the beverage of the robot in a process of gripping the cup or making the beverage may be reduced.

Further, an unmanned process of making a beverage can be achieved.

The effects of the present disclosure are not limited to the above-mentioned contents, and other technical effects that are not mentioned will be clearly understood by those of skill in the art from the following description.

Although the present disclosure has been described by specific items such as specific elements, limited embodiments, and drawings, it is merely provided to facilitate more general understanding of the present disclosure, and the present disclosure is not limited to the above embodiments, and those of skill in the art may make various modifications from the above description.

Therefore, the spirit of the present disclosure should not be limited to the above-described embodiments, and it should be understood that the following claims, as well as all modifications equal or equivalent to the claims, belong to the scope of the present disclosure.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An articulated robot arm capable of laser printing, the articulated robot arm comprising:
a communicator configured to receive beverage order information;
a grip part configured to grip and move a cup;
an articulation part having one side coupled to the grip part, the articulation part comprising a plurality of articulation units;
a controller configured to control operations of the grip part and the articulation part; and
a laser beam irradiation unit provided on at least a partial area of the grip part and configured to irradiate a laser beam to print the beverage order information on the cup,
wherein the laser beam irradiation unit comprises a distance measurement unit configured to measure a focal length of a laser beam, and
the controller is further configured to allow the focal length measured in real time by the distance measurement unit to be fixed while the laser beam irradiation unit irradiates a laser beam, wherein the focal length is a distance between the laser beam irradiation unit and a surface of a printing area.

2. The articulated robot arm of claim 1, further comprising an image sensor unit configured to scan the cup and detect the printing area based on a reference gray scale value.

3. The articulated robot arm of claim 2, wherein the controller is further configured to control at least one of the articulation part and the grip part to allow the laser beam irradiation unit to be positioned close to the printing area.

4. The articulated robot arm of claim 2, wherein the image sensor unit is further configured to determine a material or printability of the cup based on an image of the cup, and
the laser beam irradiation unit is further configured to adjust an intensity of the laser beam based on the material of the cup.

5. The articulated robot arm of claim 2, wherein the image sensor unit is further configured to determine whether an object or an entity is present in an irradiation area of the laser beam irradiation unit, and
the controller is configured to stop the laser irradiation of the laser beam irradiation unit when it is determined that the object or the entity is present in the irradiation area of the laser beam irradiation unit.

6. The articulated robot arm of claim 2, wherein the image sensor unit further comprises an auxiliary recognition unit configured to recognize a check area of the cup, and
the laser beam irradiation unit prints on the check area recognized by the auxiliary recognition unit.

7. The articulated robot arm of claim 1, further comprising a water supply unit configured to receive and discharge external water,
wherein the controller is further configured to control operations of the grip part and the articulation part to use a beverage making accessory device according to a making recipe based on the beverage order information received by the communicator.

8. The articulated robot arm of claim 1, wherein the beverage order information includes at least one of an ordered beverage name, a beverage size, an order recipe, an orderer's name, and an orderer's request.

9. The articulated robot arm of claim 1, wherein, when the grip part grips the cup and moves the cup to a placement spot, the laser beam irradiation unit prints the beverage order information.

10. The articulated robot arm of claim 1, wherein, when a beverage is being made in a beverage making accessory device, the laser beam irradiation unit prints the beverage order information on the cup.

11. The articulated robot arm of claim 1, wherein the laser beam irradiation unit further comprises an opening and closing part configured to perform an opening and closing operation to be inserted into the grip part during a non-operation.

12. A printing method using an articulated robot arm capable of laser printing, the printing method comprises:
   a receiving operation of receiving beverage order information;
   a gripping and moving operation of gripping and moving a cup by using a grip part and an articulation part;
   a printing operation of printing the beverage order information on the cup using a laser; and
   a printing area detection operation of scanning the cup and detecting a printing area based on a reference gray scale value.

13. The printing method of claim 12, wherein, in the printing area detection operation, the articulated robot arm is positioned close to the printing area.

14. The printing method of claim 12, wherein the printing operation comprises:
   a distance measurement operation of measuring a focal length of a laser; and
   a laser beam irradiation operation of allowing the focal length measured in real time by a distance measurement unit to be fixed while a laser beam is irradiated, wherein the focal length is a distance between the laser beam irradiation unit and a surface of the printing area.

15. The printing method of claim 12, wherein the printing area detection operation comprises determining a material or printability of the cup based on an image of the cup through image sensing, and
   the printing operation comprises adjusting an intensity of a laser beam based on the material of the cup.

16. The printing method of claim 12, wherein the printing operation comprises determining whether an object or an entity is present in an irradiation area of a laser beam, and stopping a laser beam irradiation when it is determined that the object or the entity is present in the irradiation area of the laser beam.

17. The printing method of claim 12, further comprising:
   a recipe determination operation of determining a making recipe based on the received beverage order information; and
   an accessory device determination operation of determining a beverage making accessory device to be used according to the making recipe, and determining an order of use of the beverage making accessory device.

18. The printing method of claim 12, wherein the beverage order information includes at least one of an ordered beverage name, a beverage size, an order recipe, an orderer's name, and an orderer request.

* * * * *